US010799057B2

(12) United States Patent
Alipour et al.

(10) Patent No.: US 10,799,057 B2
(45) Date of Patent: *Oct. 13, 2020

(54) APPARATUS FOR COOKING FOOD IN AN AIRTIGHT BAG

(71) Applicants: Ehsan Alipour, San Francisco, CA (US); Joseph Benjamin Strecker, Half Moon Bay, CA (US); Farshad Moinzadeh, Greenbrae, CA (US)

(72) Inventors: Ehsan Alipour, San Francisco, CA (US); Joseph Benjamin Strecker, Half Moon Bay, CA (US); Farshad Moinzadeh, Greenbrae, CA (US)

(73) Assignee: Unovo, LLC., Richmond, CA (US)

( * ) Notice: Subject to any disclaimer, the term of this patent is extended or adjusted under 35 U.S.C. 154(b) by 356 days.

This patent is subject to a terminal disclaimer.

(21) Appl. No.: 15/676,750

(22) Filed: Aug. 14, 2017

(65) Prior Publication Data

US 2017/0347824 A1    Dec. 7, 2017

Related U.S. Application Data

(63) Continuation of application No. 15/070,900, filed on Mar. 15, 2016, now Pat. No. 9,730,543, which is a
(Continued)

(51) Int. Cl.
*A47J 27/10*    (2006.01)
*A47J 27/18*    (2006.01)
(Continued)

(52) U.S. Cl.
CPC ............. *A47J 27/10* (2013.01); *A47J 27/004* (2013.01); *A47J 27/18* (2013.01); *B65D 33/25* (2013.01);
(Continued)

(58) Field of Classification Search
None
See application file for complete search history.

(56) References Cited

U.S. PATENT DOCUMENTS 3,819,089 A * 6/1974 Scales ................ B65D 81/3415
222/181.1
5,097,759 A * 3/1992 Vilgrain .................. A47J 17/18
219/441
(Continued)

*Primary Examiner* — Joseph M. Pelham
(74) *Attorney, Agent, or Firm* — GSS Law Group; Gregory S. Smith; Phillip M. Wagner

(57) ABSTRACT

A cooking apparatus includes a dual-chamber container with an inner container for holding a food item to be cooked and an outer container for maintaining contact between a temperature-controlled heat transfer liquid and the inner container while the food is being cooked. The dual-chamber container includes an inlet fluid port and outflow fluid port which may be coupled directly to corresponding fluid port connectors on a temperature control unit, or an intervening fluid coupling assembly may convey heat transfer liquid between the control unit and the dual-chamber container. Some control units are adapted to simultaneously control cooking temperature for more than one dual-chamber container. Some dual-chamber containers have a flexible inner container that is separable from an outer container which may be a rigid container or a flexible container.

13 Claims, 8 Drawing Sheets

Related U.S. Application Data continuation of application No. 13/776,629, filed on Feb. 25, 2013, now Pat. No. 9,282,846.

(60) Provisional application No. 61/602,516, filed on Feb. 23, 2012.

(51) Int. Cl.
    *A47J 44/00*     (2006.01)
    *A47J 27/00*     (2006.01)
    *B65D 33/25*     (2006.01)
    *B65B 31/04*     (2006.01)
    *A47J 36/16*     (2006.01)
    *A47J 36/24*     (2006.01)

(52) U.S. Cl.
    CPC ............ *A47J 36/16* (2013.01); *A47J 36/2483* (2013.01); *B65B 31/04* (2013.01)

(56) References Cited

U.S. PATENT DOCUMENTS

| | | | | |
|---|---|---|---|---|
| 5,123,337 | A * | 6/1992 | Vilgrain | A47J 17/18 366/144 |
| 5,280,748 | A * | 1/1994 | Pardo | A23L 3/10 99/330 |
| 7,503,158 | B2 * | 3/2009 | Bassett | B65B 31/04 206/524.8 |
| 7,614,203 | B2 * | 11/2009 | Oltrogge | B65D 81/2038 53/139.2 |
| 7,757,601 | B2 * | 7/2010 | Lagares Corominas | A23L 5/13 165/61 |
| 8,833,245 | B2 * | 9/2014 | Alipour | F24J 3/00 99/483 |
| 9,282,846 | B2 * | 3/2016 | Alipour | A47J 27/004 |
| 9,730,543 | B2 * | 8/2017 | Alipour | A47J 27/004 |
| 2010/0159083 | A1 * | 6/2010 | Peplinski | B65D 81/3266 426/113 |
| 2012/0061376 | A1 * | 3/2012 | McBean | A47J 36/2438 219/430 |
| 2012/0137898 | A1 * | 6/2012 | Alipour | F24J 3/00 99/483 |
| 2012/0251695 | A1 * | 10/2012 | Neff | A47J 27/004 426/509 |
| 2013/0240500 | A1 * | 9/2013 | Alipour | A47J 27/004 219/438 |
| 2013/0251867 | A1 * | 9/2013 | Carre | B65D 77/003 426/393 |
| 2013/0284031 | A1 * | 10/2013 | Braukmann | A47J 36/2483 99/343 |
| 2014/0251164 | A1 * | 9/2014 | Alipour | A47J 27/10 99/483 |
| 2014/0260998 | A1 * | 9/2014 | Pearson | A47J 27/002 99/288 |
| 2014/0322418 | A1 * | 10/2014 | Cowe | A47J 27/10 426/523 |
| 2015/0335192 | A1 * | 11/2015 | Plazarte | A47J 27/10 99/332 |
| 2016/0345610 | A1 * | 12/2016 | Backus | A23L 1/0114 |
| 2017/0156537 | A1 * | 6/2017 | Godfroid | A47J 27/10 |

\* cited by examiner

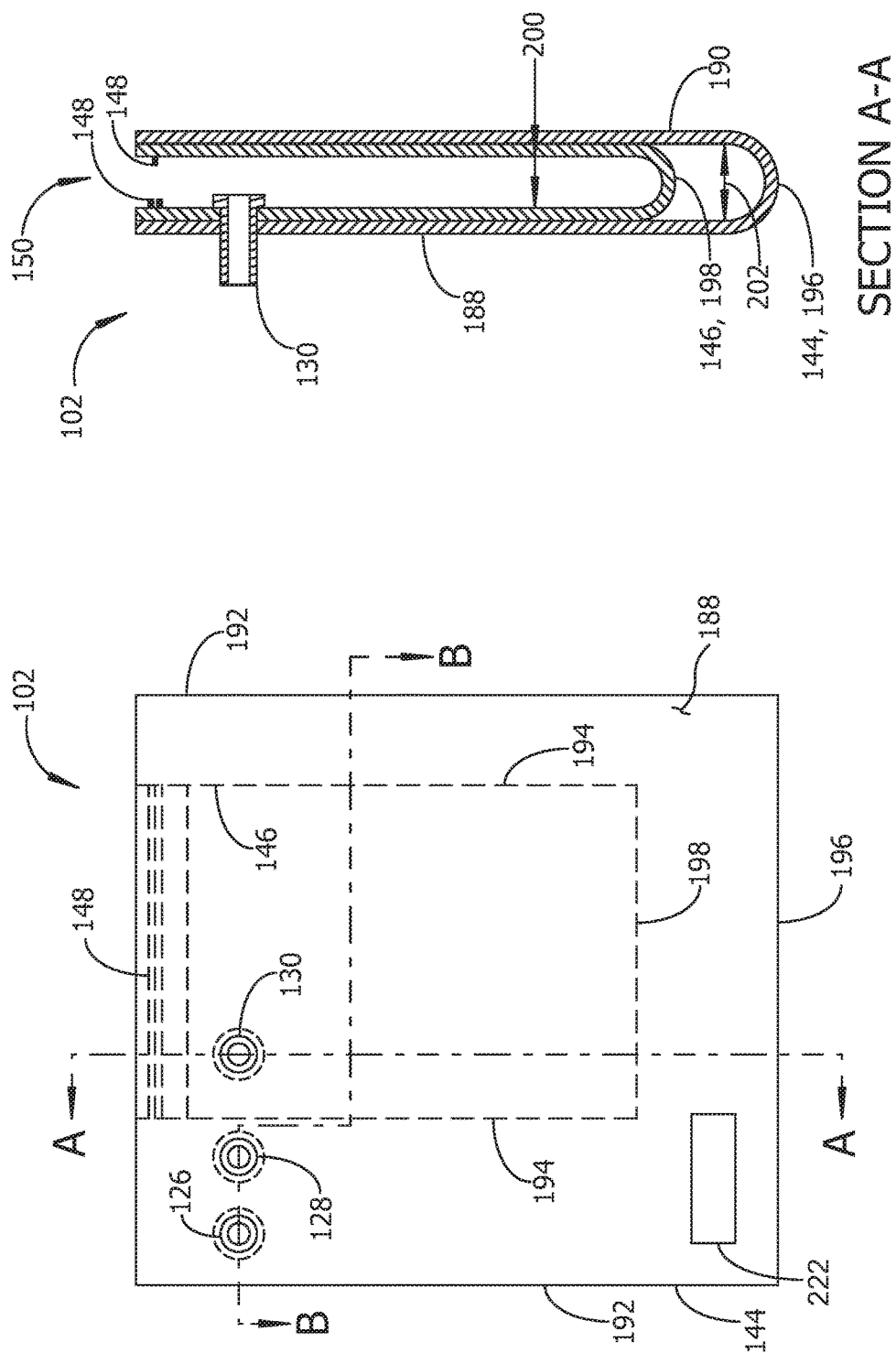

ALTERNATE SECTION A-A

SECTION B-B

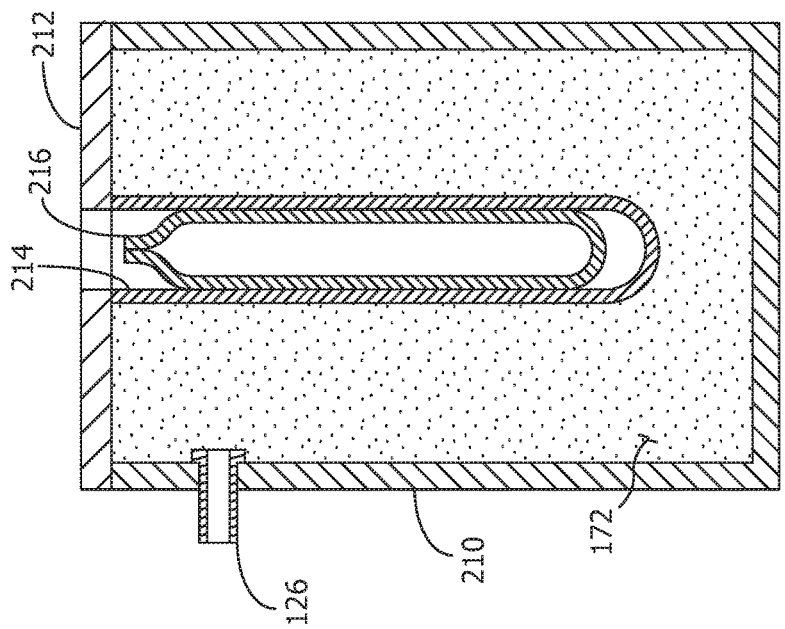
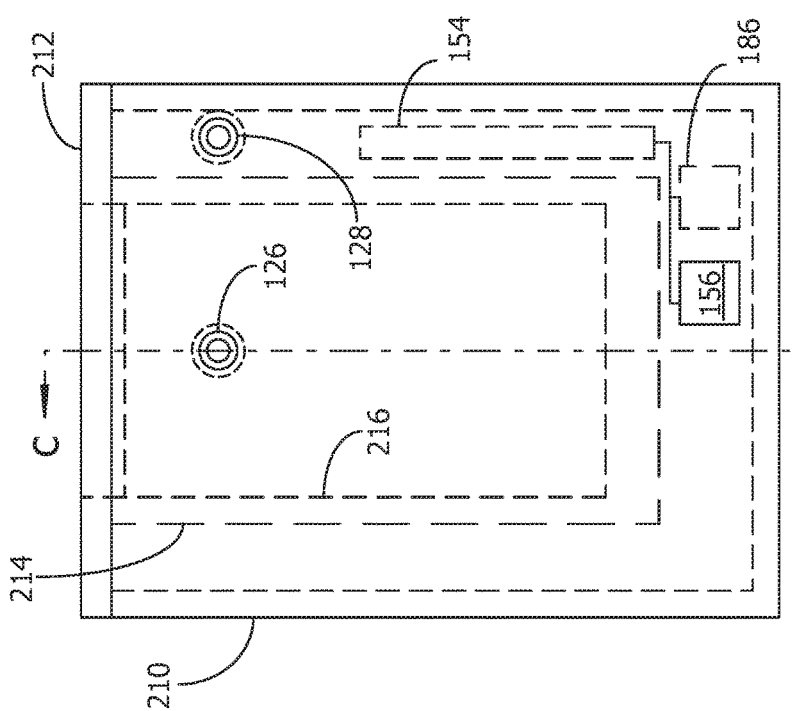
Fig. 10
Fig. 9

APPARATUS FOR COOKING FOOD IN AN AIRTIGHT BAG

FIELD OF THE INVENTION

Embodiments of the invention are related generally to cooking appliances and more specifically to apparatus for heating or cooling food sealed in a bag by thermal transfer from a temperature-controlled liquid.

BACKGROUND

Vacuum sealing food into a plastic bag and then immersing the bag in hot water, sometimes referred to as "sous vide" cooking, may result in food that has been cooked more uniformly throughout than food prepared by other cooking methods such as sautéing, frying, or grilling. Sous vide cooking may bring all parts of a food item to a safe temperature for consumption without some parts of the food overcooked and other parts undercooked. Food cooked by sous vide methods may have better flavor, texture, or nutritional value than food cooked by other methods.

While immersion cooking of vacuum-sealed food in a hot water bath may produce desirable results, there are disadvantages with methods and equipment used in the past. For example, it may take several hours to cook a food item by sous vide methods, compared to a few minutes for some other methods. It may be preferable to maintain hot water used in sous vide cooking within a narrow temperature range for the entire time needed to cook a food item. For example, some practitioners of sous vide methods suggest that water bath used for immersion cooking should be maintained within ±1° C., while others suggest even narrower limits. Maintaining water temperature within such a narrow range may be difficult to achieve, especially when more than one item is to be cooked, different types or sizes of pots are used for holding hot water, large volumes of water are used for immersion, heat sources respond slowly to set point changes, or water temperature is deliberately changed to cook different kinds of food. Immersion heaters and temperature controllers having sufficient accuracy and capacity for sous vide cooking may be large or expensive and may use control settings and terminology that could be unfamiliar to chefs. When cooking stoves are used for heating water used for immersion cooking, predicting water temperatures from settings for stovetop heating elements may be very difficult and may require extensive trial and error and frequent temperature monitoring. Conventional stoves may not be able to maintain water temperatures within a preferred range.

Cooking time and results may be unpredictable when adapting instructions for one arrangement of equipment to another. Improperly cooked food may represent a substantial financial loss for a commercial kitchen and may expose many diners to a health hazard. Stovetop burners or heating elements being used to heat water may not be available for other cooking tasks while sous vide cooking is underway, so valuable kitchen space and equipment may be tied up for hours. Immersion heaters may have exposed heating surfaces that present a burn hazard to persons near the equipment. A container of hot liquid in a crowded or busy kitchen may represent a safety hazard to persons working near the container, for example spills or contact with hot pots or cooking surfaces. Liquids used for immersion cooking may present other safety hazards. For example, flammable cooking oil may be used instead of water for some sous vide preparations. Any of these problems or disadvantages may multiply when more than one water bath is needed, either for achieving a desired cooking capacity or for simultaneously cooking different food items at different temperatures.

SUMMARY

Some embodiments of a cooking apparatus include a control unit having a reservoir for holding a heat transfer liquid and a heating element for transferring thermal energy to the reservoir. The control unit includes a temperature controller electrically connected to the heating element. The temperature controller is adapted to control a temperature of a liquid held in the reservoir. The control unit further includes a fluid outflow port in fluid communication with the reservoir and a fluid return port in fluid communication with the reservoir. An embodiment of the invention may further include a dual-chamber container having an inner container formed with an internal space for hold food to be cooked, an outer container formed with an internal space for holding the internal container, a fluid inlet port in fluid communication with the internal space in the outer container and not in fluid communication with the internal space in the inner container, and a fluid outflow port in fluid communication with the internal space in the outer container and not in fluid communication with the internal space in the inner container, wherein the fluid inlet port on the dual chamber container is adapted for fluid communication with the fluid outflow port on the control unit and the fluid outflow port on the dual chamber container is adapted for fluid communication with the fluid return port on the control unit

BRIEF DESCRIPTION OF THE DRAWINGS

FIG. 5 is a view toward the front side of an example of dual-chamber container implemented as a dual-chamber bag.

FIG. 6 is an example of a cross-sectional view A-A from FIG. 5.

FIG. 9 is a view toward a front panel of an example of a dual-chamber container having a pocket for holding a removable food container.

FIG. 10 is an example of a cross-sectional view C-C from the example of FIG. 9.

DESCRIPTION

Figure 1:
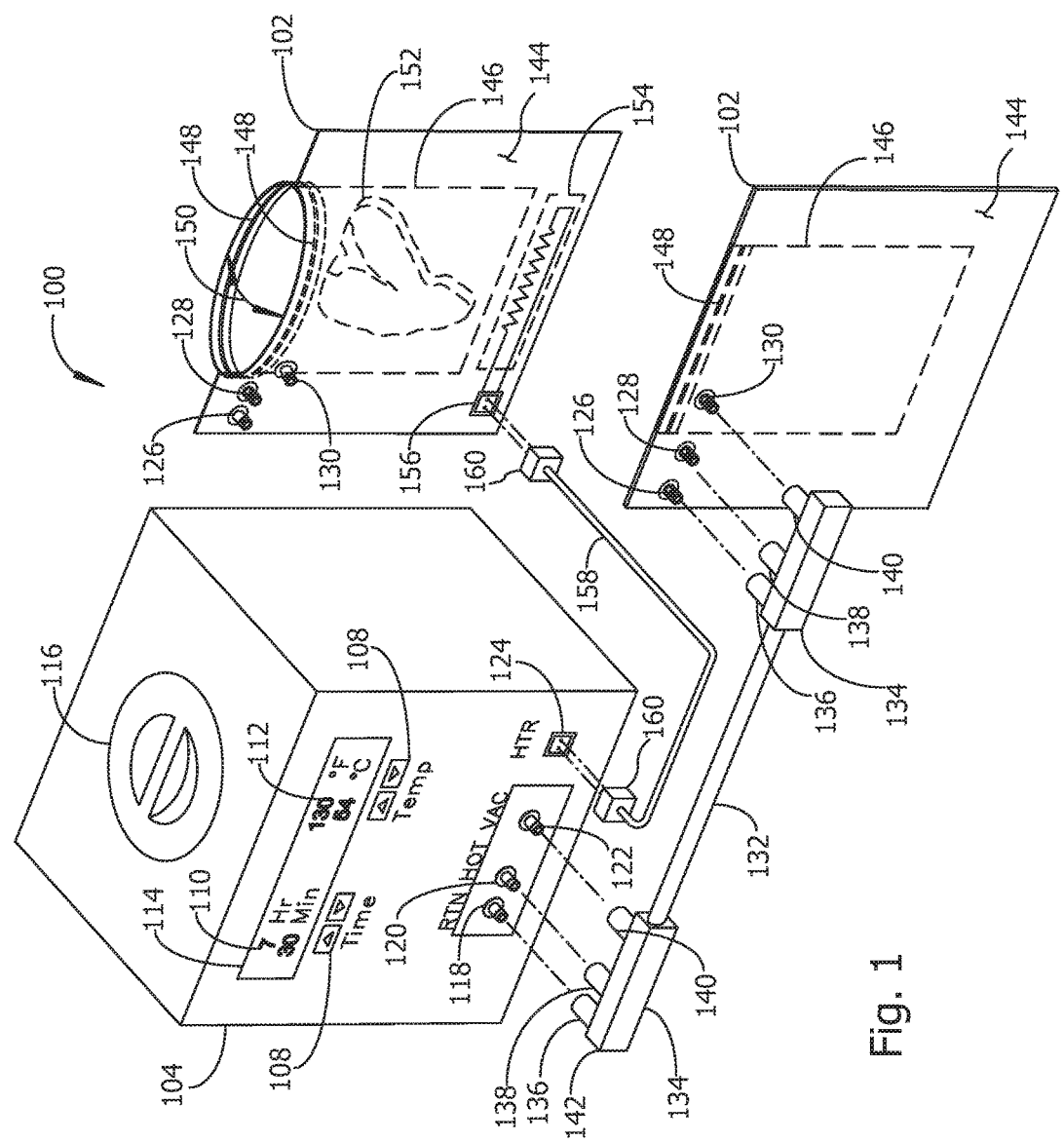
FIG. 1 is a pictorial view of an example of a cooking apparatus including a cooking unit and a dual-chamber container.

An apparatus for immersion cooking of food includes a dual-chamber container for maintaining thermal contact between a food item being cooked and a heat transfer liquid, without direct contact between the food item and heat transfer liquid. A dual-chamber container includes an inner container for holding a food item to be cooked and an outer container which fully surrounds the space for holding food in the inner container. Heat transfer liquid may flow into and out of the outer container and around the front, back, left, right, and bottom sides of the inner container. In some embodiments of a dual-chamber container, the inner container is permanently attached to, or alternately formed as an integral part of, the outer container. Alternately, the outer container may include a pocket for holding a removable inner container.

An embodiment of the invention optionally includes a control unit for controlling the flow of heat transfer liquid into and out of a dual-chamber container and for controlling the temperature of the heat transfer liquid. Fluid ports on a dual-chamber container couple to corresponding fluid ports on the control unit so that heat transfer liquid may be exchanged between the outer container of the dual-chamber container and a fluid reservoir in the control unit. The control unit includes a temperature control module, heating elements, and optional cooling elements for accurately controlling the temperature of heat transfer liquid delivered through the fluid ports to the dual-chamber container. The control unit optionally includes a liquid pump for circulating heat transfer liquid between one or more dual-chamber containers and the reservoir in the control unit, and may optionally include a vacuum pump for removing air from the inner container of a dual-chamber container.

A dual-chamber container may be implemented as a container with rigid exterior and interior walls for retaining heat transfer liquid and a void or pocket for holding a food item in an inner container. Alternatively, exterior walls forming the outside of the outer container may be rigid and interior walls surrounding, or alternately forming, an inner container may be flexible. Flexible inner walls may enable the walls to conform more closely to the shape of a food item in the inner container when heat transfer liquid is pumped into the outer container, thereby improving heat transfer between the food item and the heat transfer liquid.

A dual-chamber container may alternatively be implemented as two flexible bags, one inside the other. The outer bag surrounds the inner and retains heat transfer liquid. The inner bag may be adapted for vacuum sealing and may be made from a material that is impervious to heat transfer liquid and to air. An inner bag adapted for re-use optionally includes a sealable opening that is impervious to air and heat transfer liquid when closed and sealed, but which may be unsealed an opened to access the interior of the bag to place or remove a food item inside the bag. Fluid ports on a dual-chamber bag may connect directly to fluid ports on a control unit. Alternately, fluid connections between a control unit and a dual-chamber container, including inlet and outlet paths for heat transfer liquid and an optional vacuum line, may be made by a fluid coupler assembly comprising tubing and fluid connectors. The fluid coupler assembly may include flexible hose for making fluid connections or may alternatively be made from rigid tubing having sufficient stiffness to support the weight of one or more dual-chamber bags during cooking.

Embodiments of the invention are advantageous for precise control of cooking time and cooking temperature of food items sealed into a dual-chamber container. Further advantages include isolating persons near the equipment from contact with surfaces hot enough to cause burns, preventing spills of hot liquids such as hot heat transfer liquid, convenient set up of cooking parameters such as cooking temperature and time duration, predictability of cooking times to achieve a preferred degree of cooking, and suitability for use with different heat transfer liquids.

As used herein, a heat transfer liquid refers to a liquid heat transfer media for exchanging thermal energy between a food and a reservoir of liquid. Examples of heat transfer liquid, also referred to as heat transfer liquid, include, but are not limited to, water, salt dissolved in water, cooking oil, and mineral oil. A set point temperature refers to a preferred temperature for a heat transfer liquid, and further as the preferred temperature for a completely cooked food item. A fluid connection refers to a connection between two components that are in fluid communication with one another, that is, fluid may flow from one component to the other through the fluid connection.

For any of the embodiments of the invention described herein, a fluid connection may optionally be a permanent connection, that is, the connection is not intended to be separable during the described operation of the apparatus. Alternatively, fluid connections may be separable and may use mechanical connectors that have opposing, separable parts that firmly hold each other without leaking when connected and which may optionally include check valves to prevent fluid leaking out of the connector when the connector parts are separated from one another. Check valves may alternatively be provided separately from a connector. The medical arts include numerous examples of fluid connectors that are suitable for use with embodiments of the invention. Other examples may be found in hydraulic and pneumatic connectors.

Turning now to the figures, an example of an apparatus 100 in accord with an embodiment of the invention appears in FIG. 1. A dual-chamber container 102 includes an inner bag 146 enclosed within an outer bag 144. The inner bag 146 optionally includes a zip lock 148 for sealing the bag closed so as to prevent the exchange of liquid or vapor between the interior of the inner bag and the exterior. In an alternative embodiment of the invention, the inner bag 146 is sealable with a heat seal to form an airtight and watertight seal, thereby preventing liquid and vapor from escaping from inside the bag. A fluid inlet port 128 is in fluid communication with a space enclosed by the outer bag 144 but not with the space enclosed by the inner bag 146. A fluid outlet port 126 is also in fluid communication with the space enclosed by the outer bag 144 and not with the space enclosed by the inner bag 146. A vacuum port 130 penetrates the outer bag 144 and is in fluid communication with the inner bag 146. The vacuum port 130 is not in fluid communication with the space surrounding the inner bag 146 within the outer bag 144. The vacuum port 130 is sealed against the outer bag 144 to prevent leakage of liquid or vapor from the outer bag.

The inner bag 146 may be opened by unsealing a zip lock 148 to open a mouth 150 of the bag and access an enclosed space within the inner bag, for example to place or retrieve a food item 152. The example of a food item 152 is not a part of an embodiment of the invention. However, a dual-chamber container 102 may optionally be provided with a preloaded food item 152 vacuum sealed into the inner bag 146. A dual-chamber bag 102 may optionally be provided with a heat transfer liquid preloaded into the outer bag 144. A heating element 154 electrically connected to an electrical connector 156 may optionally be included in a dual camber food container 102 for heating liquid in the outer bag to cook food in the inner bag. The optional heating element receives electrical power through a power cable 158 having electrical connectors 160 adapted for mechanical and electrical connection to a corresponding electrical connector 156 on the outer bag 144 and a heater connector 124 n the control unit 104.

Fluid connections between the control unit 104 and one or more dual-chambered bags 102 may optionally be established by a fluid coupler assembly 142. The fluid coupler assembly 142 includes separate fluid transfer paths for heat transfer liquid flowing out of the control unit, heat transfer liquid flowing out of the dual-chamber container 10 and returning to the control unit 104, and optionally a vacuum line for extracting air from the inner bag 146 in a dual-chamber bag 102. Separate fluid paths may be implemented by bundling separate tubing or piping into a tubing assembly 132, or the separate fluid conduction paths may be integrally formed into a single piece of tubing. In some embodiments of a fluid coupler assembly 142, the tubing assembly 132 is flexible to permit convenient placement of a dual-chamber bag 102 during cooking. In other embodiments of a fluid coupler assembly 142, the tubing assembly 132 is stiff and strong enough to support the suspended weight of a dual-chamber bag loaded with food and heat transfer liquid without the tubing assembly bending, breaking, or detaching from the control unit 104.

Fluid connectors (126, 128, 130) on a dual-chamber bag 102 connect to corresponding connectors (136, 138, 140) attached to, or optionally formed as an integral part of, a manifold 134 at each end of the fluid coupler assembly 142. The manifold 134 provides an integrated, easily handled structure for simultaneously making or separating all fluid connections between two components. The manifold 134 may optionally be formed with a thermally insulating exterior to make the assembly easier and safer to handle after hot thermal transfer fluid has passed through the manifold. A liquid outflow connector 138 on the fluid coupler assembly 142 is adapted for fluid coupling to a corresponding hot liquid outflow port 120 on the control unit 104. A liquid return connector 136 on the manifold 134 is adapted for fluid coupling to a corresponding liquid return port 118 on the control unit 104. A vacuum connector 140 couples to a corresponding vacuum port 122 on the control unit.

The example of a control unit 104 in FIG. 1 optionally includes an alphanumeric display 114 for presenting time 110 and temperature 112 information to a user of the apparatus. Examples of time information displayable by a control unit include, but are not limited to, civil time, time for cooking to begin, time for cooking to end, elapsed cook time, and time remaining until cooking is done. Examples of temperature information include, but are not limited to, temperature of heat transfer liquid measured within the control unit 104, temperature of heat transfer liquid measured inside the dual-chamber container 102, preferred temperature for a selected food item, and temperature of a food item inside a dual-chamber container. User controls 108 are provided for setting time and temperature values related to cooking. The control unit example 104 of FIG. 1 further includes a removable cover 116 for accessing a reservoir for heat transfer liquid inside the control unit. The reservoir will be explained in more detail later in relation to FIG. 4.

Figure 2:
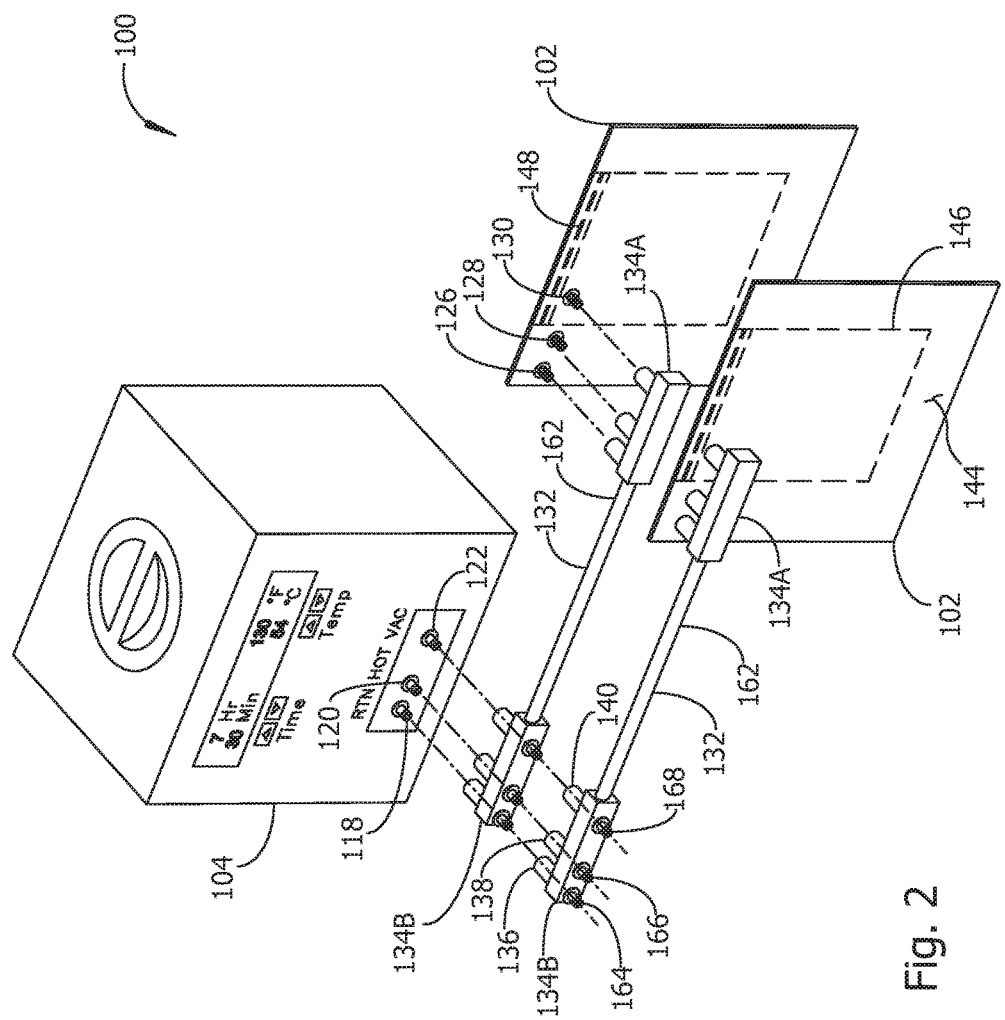
FIG. 2 is a pictorial view of an example of a cooking apparatus adapted to for connection of more than one dual-chamber container.
Figure 3:
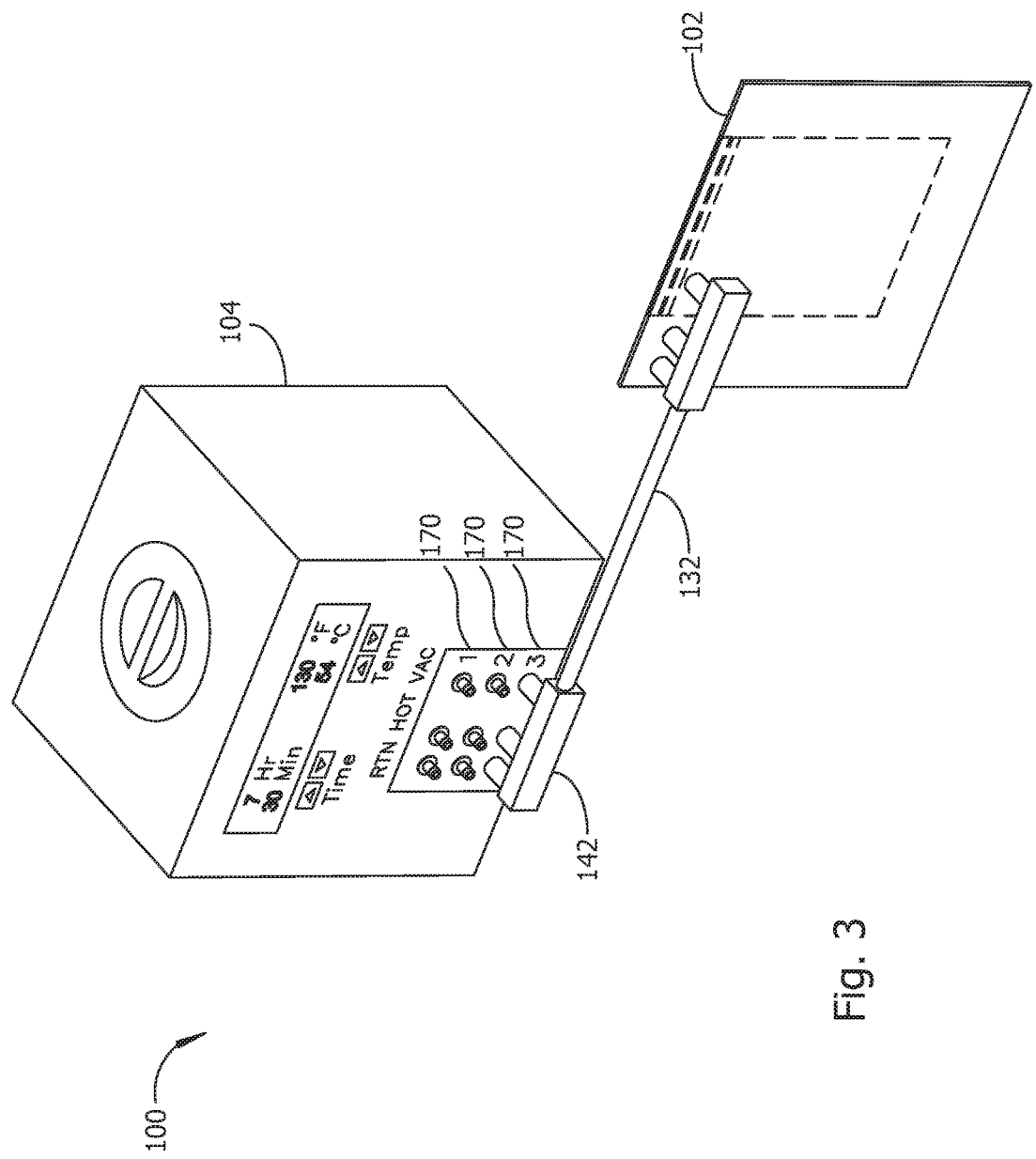
FIG. 3 is a pictorial view of an example of a control unit having more than one row of fluid ports for optionally cooking more than one food item simultaneously.

Some embodiments of the invention are adapted for simultaneous cooking of more than one food item. In the example of an embodiment of the invention 100 in FIG. 2, stackable fluid coupler assemblies 162 enable more than one dual-chamber bag 102 to be connected to and controlled by one control unit 104. Each dual-chamber bag includes an inner bag 146, an outer bag 144, a zip lock seal 148, a liquid outflow port 126, a fluid inlet port 128, and an optional vacuum port 130. A stackable fluid coupler assembly 162 includes a first manifold 134A for establishing fluid connections to a dual-chamber container 102 as described above. The stackable fluid coupler assembly 162 also includes a second stackable connector manifold 134B having fluid connectors (136, 138, 140) on one side that are adapted to connect for fluid communication with corresponding connectors (118, 120, 122) on a control unit 104 or connectors (164, 166, 168) on a stackable manifold 134B on another stackable fluid coupler assembly 162. Dimensions of a stackable manifold 134B may optionally be selected so that space is provided for dual-chamber bags 102 between adjacent manifolds 134A. Tubing assemblies 132 may optionally be made rigid and strong enough to support the weight of dual-chamber bags 102. A control unit may optionally include more than one row 170 of fluid ports as shown in the example of FIG. 3. FIG. 3 shows an example of an embodiment of the invention with a dual-chamber bag 102 in fluid communication with three ports in a third row 170 on the control unit 104.

Figure 4:
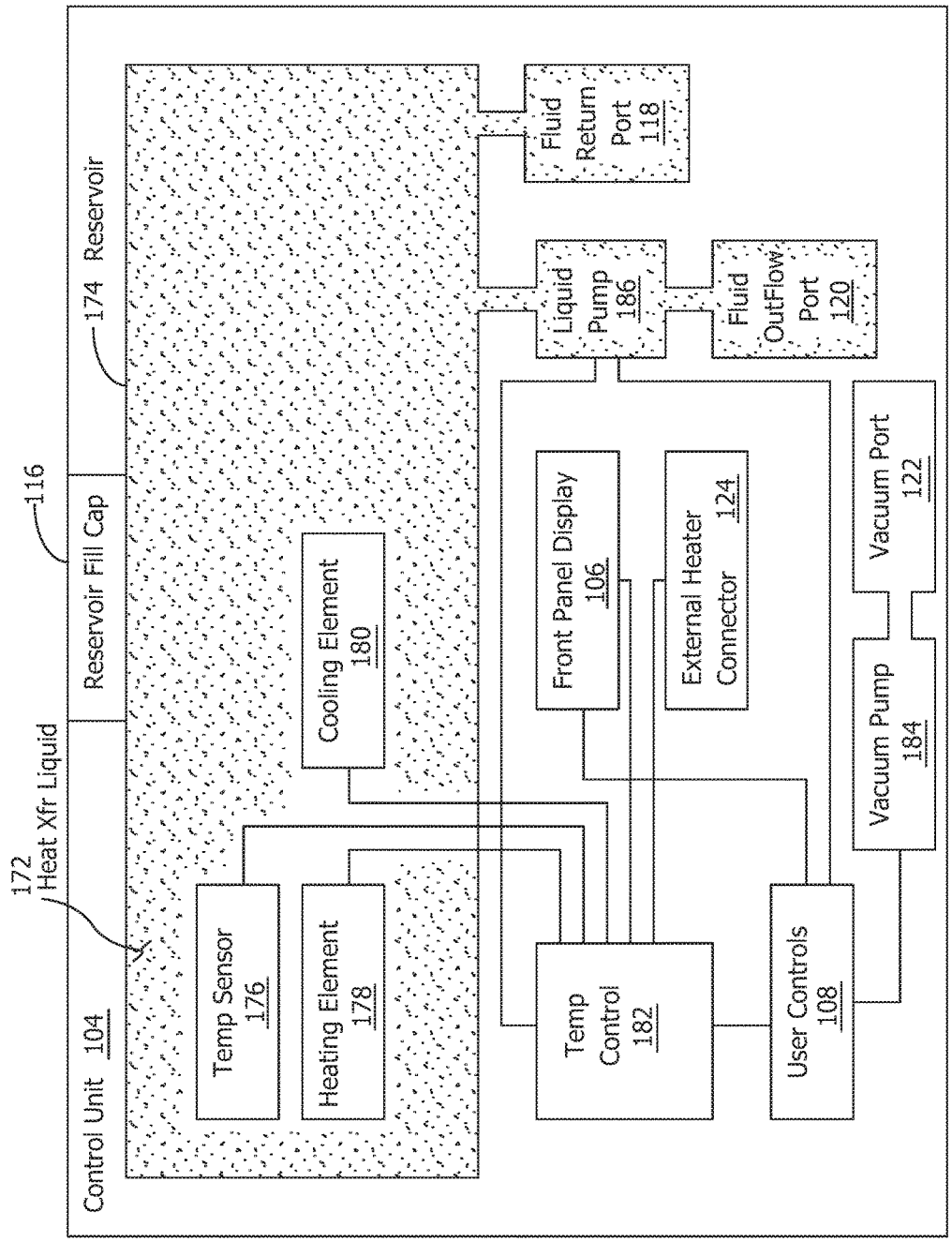
FIG. 4 is a block diagram of an example of a control unit.

Some details of an example of a control unit 104 are shown in block diagram form in the example of FIG. 4. A control unit 104 may include a reservoir 174 for heat transfer liquid 172. A reservoir fill cap 116 may optionally be provided to enable filling or cleaning of the reservoir 174. A temperature controller 182 monitors a temperature sensor 176 and controls a heating element 178 and optionally a cooling element 180 to maintain a temperature of the heat transfer liquid 172 set with user controls 108. User controls 108 may also be used to set time parameters related to cooking. Time and temperature information may be displayed on a front panel display 106. An optional heater connector 124 may be provided for establishing electrical connections to an optional heating element 154 in a dual-chamber bag (ref. FIG. 1). User controls 108 may activate a vacuum pump 184 in fluid communication with the vacuum port 122 for removing air from the inner bag of a dual-chamber container coupled to the control unit 104. A pump 186 may be provided for circulating liquid between from the reservoir 174 out through the fluid outflow port 120. Heat transfer liquid returning from a dual-chamber container passes through a fluid return port 118 and then into the reservoir 174. In the example of FIG. 4, components which are in fluid communication with one another during cooking are marked by stippling.

An example of a dual-chamber container implemented as a dual-chamber bag is shown in the example of FIG. 5 and related example of a cross-sectional view A-A in FIG. 6. The example of a dual-chamber bag 102 includes an inner bag 146 having side edges 194, a bottom side 198, and a mouth 150 sealable by a zip lock 148. The outer bag 144 is optionally formed with side edges 192 and a bottom side 196, forming an interior space 202 that surrounds the inner bag 146. A liquid outflow port 126 and a fluid inlet port 128 are in fluid communication with the interior 202 of the outer bag 144, but not with the interior 200 of the inner bag 146. A vacuum port 130 in fluid communication with the interior 200 of the inner bag passes through the front panel 188 of the outer bag and is sealed against the front panel of the outer bag to prevent leaks from the outer bag. A label 222 on an outer surface of the outer bag 144 may optionally be provided to show cooking instructions or other information related to an optional food item preloaded in the inner bag.

The label 222 may alternatively be implemented as human-readable text, a bar code, a QR code, or another machine-readable code format.

Figure 7:
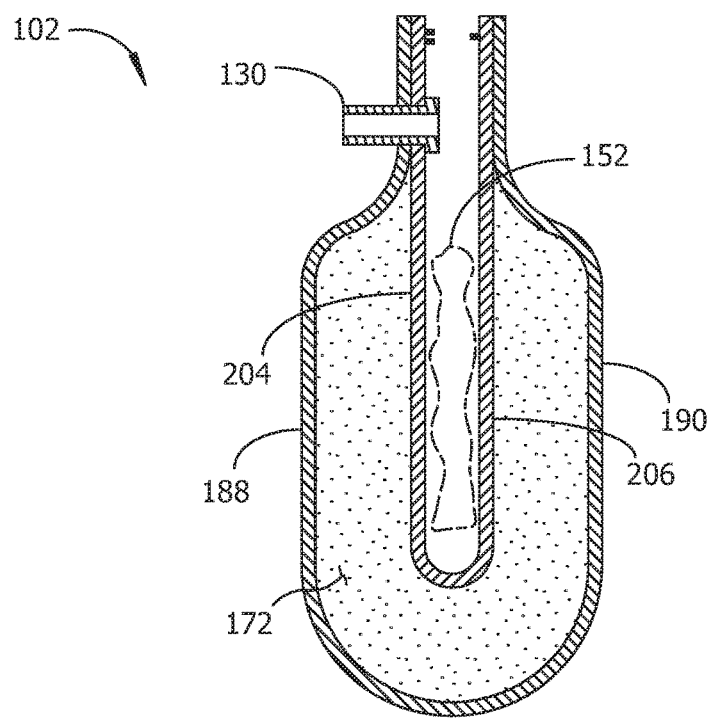
FIG. 7 is an alternate representation of cross-sectional view A-A in which the inner and outer bags have been expanded to show an interior space for holding a food item and another interior space filled by a heat transfer liquid.

FIG. 7 illustrates an alternate view of Section A-A from FIG. 5. In the dual-chamber bag 102 example of FIG. 7, heat transfer liquid 172 fills a space between the front 188 and rear 190 panels of the outer bag and the front 204 and rear 206 panels of the inner bag. The inner bag is shown with the mouth unsealed and an example of a food item 152 inside the inner bag. After closing and sealing the mouth of the inner bag, air may be removed from the inside of the inner bag by connecting a vacuum line to the vacuum port 130.

Figure 8:
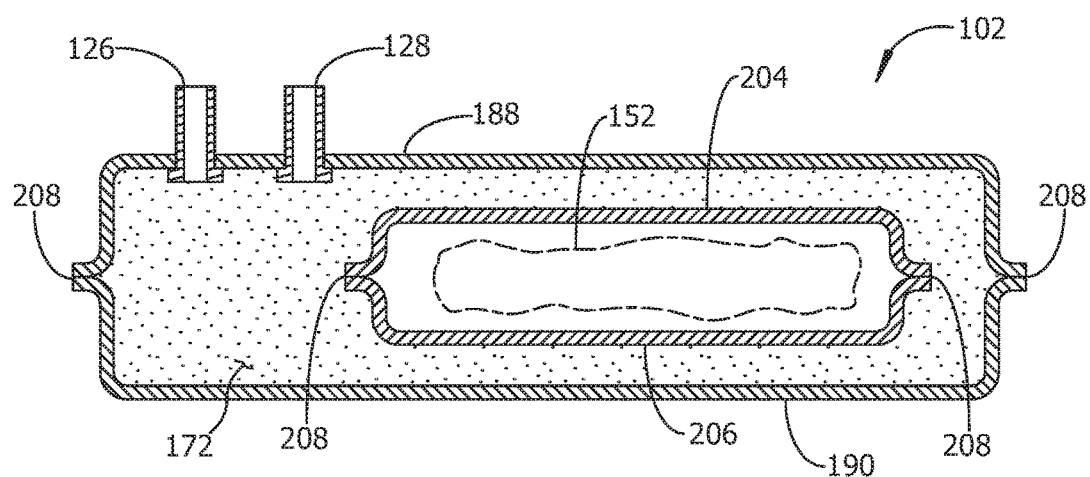
FIG. 8 is an example of cross-sectional view B-B from FIG. 5 in which the inner and outer bags have been expanded to show separate spaces for holding heat transfer liquid and a food item.

FIG. 8 continues the example of FIGS. 5 and 7, showing an example of a cross-section B-B with heat transfer liquid 172 filling a space between the front 188 and back 190 panels of the outer bag, surrounding an example of a food item 152 in the interior of a space formed by the front panel 204 and back panel 206 of the inner bag. The front and back panels of the inner bag may be joined at seams 208, or the panels may be integrally formed with one another. The front and back panels of the outer bag may be similarly joined. An example of a liquid outflow port 126 and a fluid inlet port 128 show how fluid communication may be established with the interior of the outer bag. In an alternative embodiment of the invention, fluid connections to the inner and outer bags are established with connectors adapted to pierce the bags. A bag adapted for piercing may be suitable for a single use followed by disposal of the bag after cooked food is removed.

A container for holding food may optionally be separable from a container for holding heat transfer liquid. FIG. 9 shows an example of a dual-chamber container having an outer container 210 with a pocket 214 for holding a removable food container 216. A removable food container 216 may optionally be provided as a bag preloaded with a food item and vacuum sealed. A removable food container 216 may be a reusable container or a single-use container. Exterior surfaces of the container 210 may optionally be fabricated from a flexible heat insulating material, for example silicone rubber. The exterior container optionally includes a liquid outflow port 126 and a fluid inlet port 128 for establishing fluid communication with a space for holding heat transfer liquid between the pocket 214 and exterior walls of the container. The pocket 214 may optionally be fabricated from a flexible material that conforms to the outside surfaces of the food container 216 under the influence of pressure exerted by the heat transfer liquid 172. The container 210 may optionally include a pump 186 or a rotating impeller (not illustrated) for circulating heat transfer liquid 172 inside the container 210. A heater 154 may optionally be included in the container 210. An electrical connector 156 is electrically connected to the heater 154 and pump 186 when either one is present.

FIGS. 9 and 10 are representative of a container 210 made from a flexible material or from a stiff material. Alternatively, a stiff material, for example metal, ceramic, or plastic, may be used to form a container with hard sides and bottom. A container with hard sides and bottom may resist punctures better than a container made from a flexible material. A container with hard sides may be open at the top or may optionally be fitted with a removable cover 212 as suggested in FIGS. 9 and 10.

Figure 11:
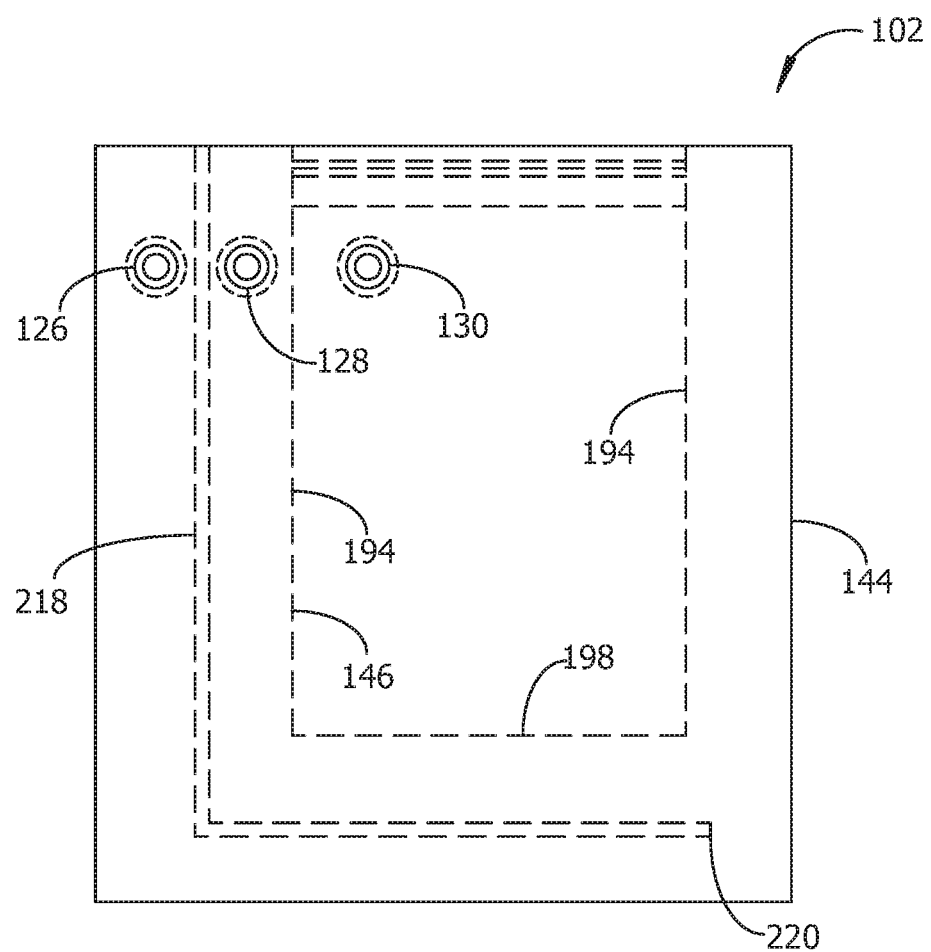
FIG. 11 is a view toward the front panel of an example of a dual-chamber container having a flow barrier between the front and back panels of the outer container to disperse heat transfer liquid flowing into a fluid inlet port on the outer bag around the inner bag before the liquid exits an outflow port on the outer bag.

In the preceding examples of a dual-chamber container, fluid port connectors are shown in close proximity to one another to enable simultaneous connection and disconnection to all three ports by a group of corresponding connectors on a manifold. However, when an inlet port is separated by a short distance from a fluid outflow port, some of the heat transfer liquid introduced through the inlet port may flow directly to the outflow port without passing over and around the inner container, possibly reducing the efficiency of thermal transfer from the fluid to the food and possibly resulting in uneven cooking. One or more flow barriers may be included in the interior of the outer bag to direct heat transfer liquid across the inner bag before the fluid exits the outer bag. FIG. 11 shows an example of a dual-chamber bag having a flow barrier 218 for directing heat transfer liquid across the inner bag 146 before exiting the outer bag 144. In the example of FIG. 11, the flow barrier passes between the outflow port 126 and inlet port 128 and extends to an opposite corner of the outer bag. A flow barrier may alternatively shaped or located differently than shown in the example of FIG. 11. A flow barrier 218 may be implemented by attaching the interior surface of the front panel of the outer bag to then interior surface of the rear panel, for example by fusing the surfaces together, by an adhesive, or with one or more rivets or other fasteners. A flow barrier may alternatively be implemented as a web or wall extending from the front panel of the outer bag to the back panel.

Unless expressly stated otherwise herein, ordinary terms have their corresponding ordinary meanings within the respective contexts of their presentations, and ordinary terms of art have their corresponding regular meanings.

The invention claimed is:

1. A dual-chamber container; comprising:
    an inner container formed with an internal space for holding food to be cooked;
    an outer container attached to said inner container, said outer container formed with an internal space for holding said inner container, said outer container comprising:
        a fluid inlet port comprising a first fluid connector attached to said outer container, said first fluid connector in fluid communication with said internal space in said outer container and not in fluid communication with said internal space in said inner container; and
        a fluid outflow port comprising a second fluid connector attached to said outer container, said second fluid connector in fluid communication with said internal space in said outer container and not in fluid communication with said internal space in said inner container; and
    a third fluid connector attached to said inner container, said third fluid connector in fluid communication with said internal space in said inner container and not in fluid communication with said internal space in said outer container.

2. The dual-chamber container of claim 1, wherein said inner container comprises a flexible inner bag having a zip lock.

3. The dual-chamber container of claim 1, wherein said inner container is joined to said outer container.

4. The dual-chamber container of claim 1, wherein said inner container is separable from said outer container.

5. The dual-chamber container of claim 4, where said outer container is formed with a pocket for holding said inner container.

6. The dual-chamber container of claim 5, wherein said outer container is formed with rigid sides.

7. The dual-chamber container of claim 1, wherein said outer container further comprises a heating element.

8. The dual-chamber container of claim 1, wherein said outer container further comprises a pump for circulating liquid inside said outer container.

9. The dual-chamber container of claim 1, wherein said third fluid connector passes through a panel of said outer container.

10. The dual-chamber container of claim 1, further comprising a flow barrier attached to said outer container between said first fluid connector and said second fluid connector.

11. A dual-chamber container, comprising:
  an inner container formed with an internal space for holding food to be cooked;
  an outer container attached to said inner container, said outer container formed with an internal space for holding said inner container, said outer container comprising:
    a fluid inlet port comprising a first fluid connector attached to said outer container, said first fluid connector in fluid communication with said internal space in said outer container and not in fluid communication with said internal space in said inner container; and
    a fluid outflow port comprising a second fluid connector attached to said outer container, said second fluid connector in fluid communication with said internal space in said outer container and not in fluid communication with said internal space in said inner container; and
  a third fluid connector attached to said inner container, said third fluid connector in fluid communication with said internal space in said inner container and not in fluid communication with said internal space in said outer container,
  wherein said third fluid connector passes through a panel of said outer container and said third fluid connector is sealed to said panel to prevent leakage from said outer container.

12. A dual-chamber container, comprising:
  an inner container formed with an internal space for holding food to be cooked;
  an outer container attached to said inner container, said outer container formed with an internal space for holding said inner container, said outer container comprising:
    a fluid inlet port comprising a first fluid connector attached to said outer container, said first fluid connector in fluid communication with said internal space in said outer container and not in fluid communication with said internal space in said inner container; and
    a fluid outflow port comprising a second fluid connector attached to said outer container, said second fluid connector in fluid communication with said internal space in said outer container and not in fluid communication with said internal space in said inner container; and
  a third fluid connector attached to said inner container, said third fluid connector in fluid communication with said internal space in said inner container and not in fluid communication with said internal space in said outer container, wherein said inner container is permanently attached to said outer container.

13. A dual-chamber container, comprising:
  an inner container formed with an internal space for holding food to be cooked;
  an outer container attached to said inner container, said outer container formed with an internal space for holding said inner container, said outer container comprising:
    a fluid inlet port comprising a first fluid connector attached to said outer container, said first fluid connector in fluid communication with said internal space in said outer container and not in fluid communication with said internal space in said inner container; and
    a fluid outflow port comprising a second fluid connector attached to said outer container, said second fluid connector in fluid communication with said internal space in said outer container and not in fluid communication with said internal space in said inner container; and
  a third fluid connector attached to said inner container, said third fluid connector in fluid communication with said internal space in said inner container and not in fluid communication with said internal space in said outer container, wherein said inner container is formed as an integral part of said outer container.

* * * * *